United States Patent [19]

Maitenaz

[11] 4,253,747
[45] Mar. 3, 1981

[54] METHOD OF PREPARING A REFRACTIVE SURFACE OF A PROGRESSIVELY VARIABLE FOCAL POWER OPHTHALMIC LENS

[75] Inventor: Bernard Maitenaz, Joinville le Pont, France

[73] Assignee: Essilor International (Compagnie Generale d'Optique), Creteil, France

[21] Appl. No.: 37,350

[22] Filed: May 9, 1979

[30] Foreign Application Priority Data

May 12, 1978 [FR] France .................. 78 14228

[51] Int. Cl.$^3$ .................................. G02C 7/06
[52] U.S. Cl. ........................ 351/169; 351/176; 351/177
[58] Field of Search ................ 351/169, 176, 177

[56] References Cited

U.S. PATENT DOCUMENTS

| | | | |
|---|---|---|---|
| 2,878,721 | 3/1959 | Kanolt | 351/169 |
| 3,687,528 | 8/1972 | Maitenaz | 351/169 |
| 3,711,191 | 1/1973 | Tagnon | 351/169 |
| 3,785,724 | 1/1974 | Cretin-Maitenaz | 351/169 |
| 3,910,691 | 10/1975 | Maitenaz | 351/169 |
| 4,055,379 | 10/1977 | Winthrop | 351/169 X |
| 4,056,311 | 11/1977 | Winthrop | 351/169 |
| 4,062,629 | 12/1977 | Winthrop | 351/169 |

*Primary Examiner*—John K. Corbin
*Assistant Examiner*—Scott J. Sugarman

[57] ABSTRACT

A method of preparing a surface of refraction of a progressively variable power ophthalmic lens, in which a first family of surfaces $S_1$ having predetermined optical characteristics is determined within a given system of rederence. Within the same system of reference a second family of surfaces $S_2$ having other predetermined characteristics is determined, each surfaces $S_1$ of the first family is associated with each surfaces $S_2$ and their curves of intersection C and D are determined. Among the pairs of surfaces $S_1S_2$ is selected that one whose curves C and D provide therebetween a corridor respectively at least 15 and 18 mm wide in the intermediate vision zone $Z_2'$ and in the near vision zone $Z_3'$. The refractive surface S of the ophthalmic lens is selected so as to have the part of the surface S of the selected pair which is between the curves C and D, and the part of the surface $S_2$ of the selective pair which is outside curves C and D.

5 Claims, 19 Drawing Figures

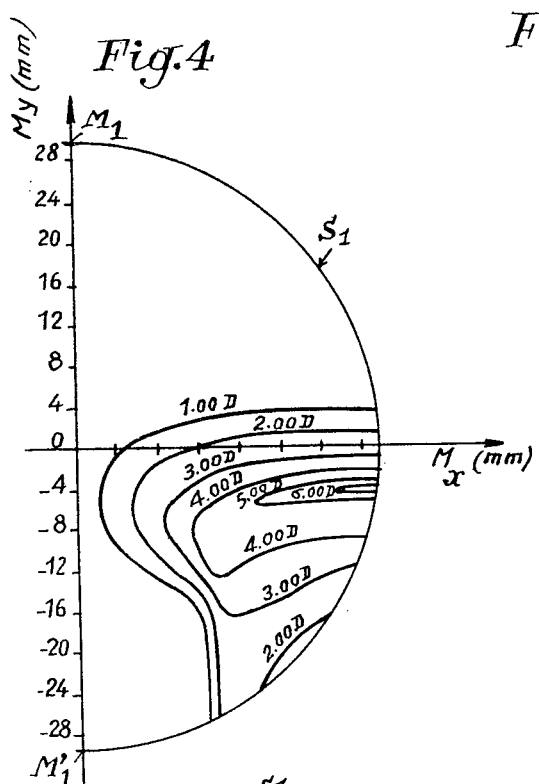
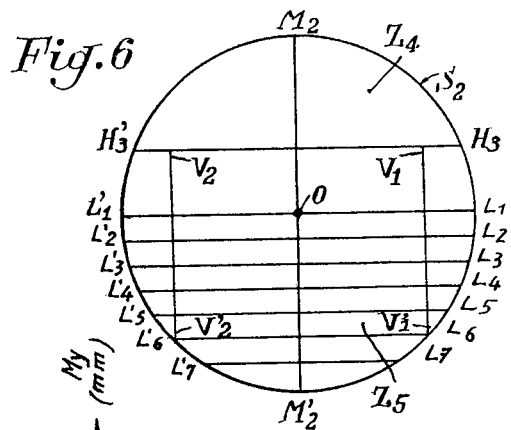
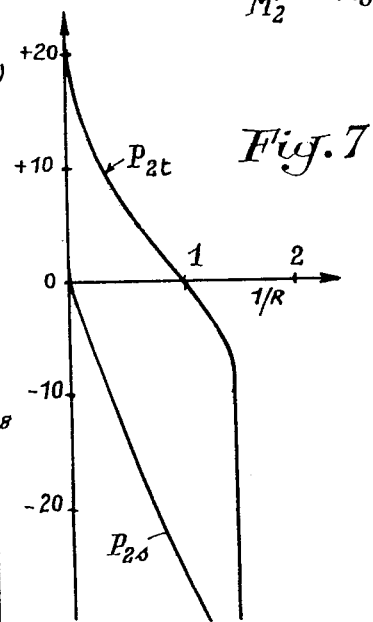
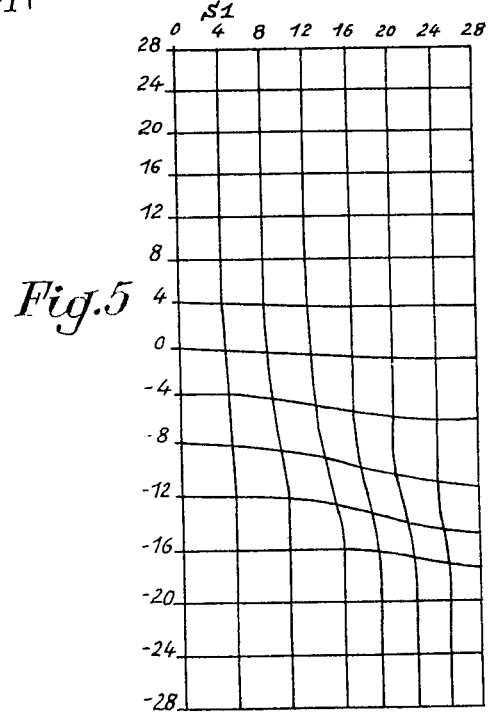
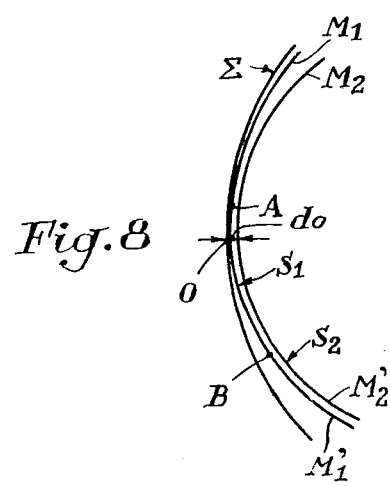

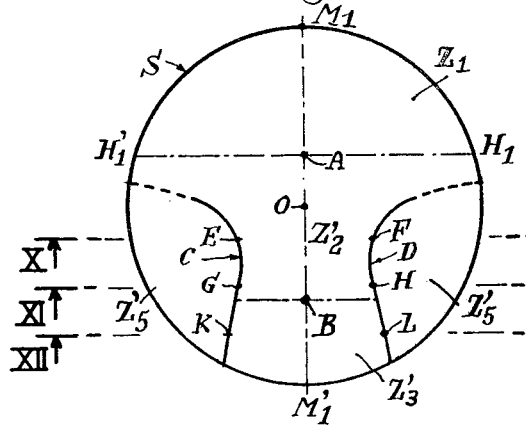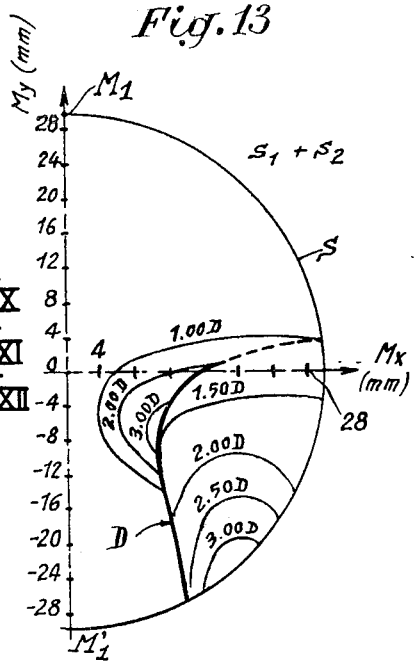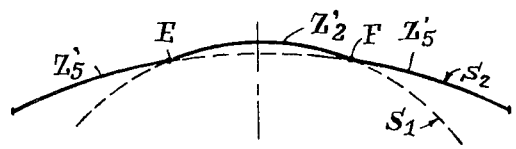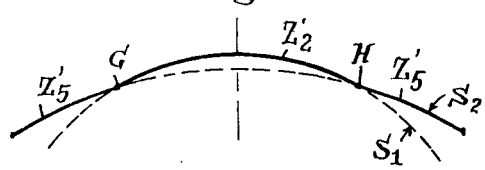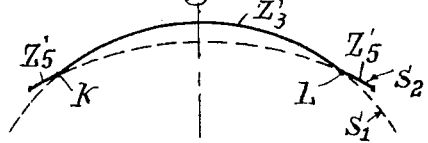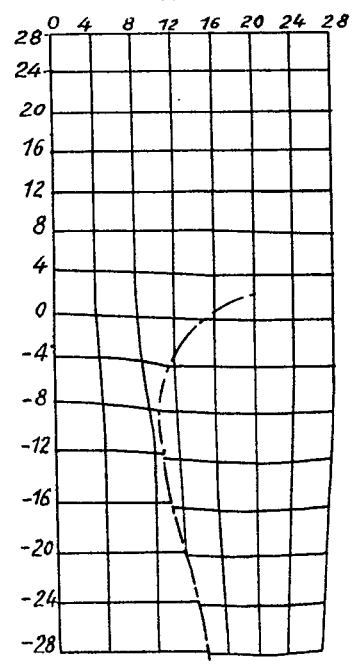

METHOD OF PREPARING A REFRACTIVE SURFACE OF A PROGRESSIVELY VARIABLE FOCAL POWER OPHTHALMIC LENS

BACKGROUND OF THE INVENTION

1. Field of the Invention

The present invention relates to a method of preparing a refractive surface of a progressively variable focal power ophthalmic lens, comprising the steps of defining a curve having a curvature which varies progressively according to a predetermined law along at least a part of said curve, defining a first family or surfaces admitting said curve as a main meridian curve, so that each surface of the first family comprises an upper zone having a first substantially constant focal power for distant vision, a lower zone having a second substantially constant focal power for near vision and an intermediate zone situated between the upper and lower zones and connected continuously therewith, said intermediate zone having a focal power which varies progressively from the first focal power at its upper limit to the second focal power at its lower limit according to said predetermined law along said part of the main meridian curve, which extends substantially vertically across the three zones in their middle and is an umbilic curve at least in the intermediate zone, the difference between said second power and said first power being called the power addition, in drawing up for each surface of the first family a table of deviations in relation to a reference sphere and a chart of the astigmatism aberrations, in choosing among the surfaces of the first family those whose astigmatism aberrations are concentrated in the outer lateral parts of the intermediate zone.

2. Prior art

Progressively variable focal power ophthalmic lenses are already known, of which one of the two refractive surfaces has a structure similar to that described above.

The upper and lower zones have a spherical shape, and the curves of intersection of the intermediate zone of the refraction surface by planes perpendicular to the main meridian curve have a circular shape. Such surfaces are for example described in French Pat. Nos. 1,095,375 and 1,544,799. The refractive surfaces described in these two French patents have advantage of having an intermediate zone whose median part, i.e. the part situated on each side of the main meridian curve and in the vicinity thereof, does not present or practically not any astigmatism aberration. However, in the lateral parts of the intermediate zone, the astigmatism aberrations and the oblique distortion increase rapidly further away from the main meridian curve. This may be illustrated by observing a grid-shaped object through the lens. It may in fact be seen that vertical and horizontal lines of the object which are seen through the lateral parts of the intermediate zone of the refraction surface are very greatly distorted.

This disadvantage is overcome when an ophthalmic lens is used having a surface of refraction such as that shown in FIGS. 7 and 8 in French Pat. No. 1,095,375. In this case, the progressively variable focal power intermediate zone and the substantially constant focal power lower zone for near vision are formed only in the median part of the refractive surface and the upper substantially constant focal power zone for distant vision is extended downwards to the lower edge of the refractive surface on each side of said median part. Since the upper zone and its downward lateral extensions have a constant power, i.e. have a spherical shape, we obtain a lens whose lateral parts present no astigmatism aberrations nor oblique distortion. That is to say that the vertical and horizontal lines of a grid-shaped object seen through the lateral parts of the lens remain vertical and horizontal. However, as can be clearly seen in FIG. 8 of French Pat. No. 1,095,375, the refractive surface of such a lens presents inevitably at the boundary between the progressively variable focal power median part and each of the two downward lateral extensions of the upper zone a discontinuity or facet in the shape of a step parallel to the plane of the main meridian curve, which is unaesthetic. Furthermore, the horizontal lines of the image of the grid seen through the lens present considerable shift in the vertical direction at the position of the facets, which is extremely awkward for the wearer of spectacles when he goes from looking through said median part to looking through one of said lateral parts or vice-versa.

So as to attenuate the oblique distortion of a progressively variable focal power ophthalmic lens, it has also been proposed to construct the refractive surface so that the horizontal sections of said refractive surface, i.e. its sections through planes perpendicular to the main meridian curve, comprise a single section of circular shape, the other horizontal sections having the shape, or substantially the shape, of conic section portions, i.e. the shape of portions of ellipses, hyperbola or parabola, whose radius of curvature increases in the direction away from the main meridian curve when the radius of curvature at the point of intersection of the conic section considered with the main meridian curve has a smaller value than the value of the radius of the circular shaped section, and whose radius of curvature decreases in the direction away from the main meridian curve when the radius of curvature at the point of intersection of the conic section considered with the main meridian curve has a value greater than the value of the radius of the circular shaped section. Furthermore, the refractive surface may comprise in its upper part and in its lower part at least one horizontal line which is an umbilic curve or a curve along which the vertical component of the prismatic effect has a constant value, i.e. a curve at each point of which the plane tangential to the refractive surface forms a constant angle with the horizontal plane which contains the optical center of the lens and which is perpendicular to the main meridian curve. The refractive surface may furthermore comprise in its lateral parts at least one vertical line along which the horizontal component of the prismatic effect is constant, i.e. at each point of which the plane tangential to the surface of refraction forms a constant angle with the plane, of the main meridian curve. See in this connection French Pat. No. 2,058,499 and its first Certificate of Addition No. 2,079,663. With such a structure of the refractive surface, it is possible to reduce to a large extent the oblique distortion, but this reduction of the oblique distortion is obtained at the price of a different distribution of the astigmatism aberrations over a greater area of the surface.

SUMMARY OF THE INVENTION

The object of the present invention is to provide a method of preparing a refractive surface whose lower zone corresponding substantially to the lower half of the refraction surface comprises a progressively variable focal power median part, which is the widest possible and which presents small astigmatism aberrations, a substantially constant focal power lower part for near vision, which is wider than said median part so as to ensure a wide field for near vision and, on each side of said median part and said lower part, outer lateral parts which present no or little oblique distortion, and with which the horizontal lines of the image of a grid seen through a lens comprising such a refraction surface present no or little vertical shift at the boundary between each of said lateral parts and said median and lower parts.

To this end, the method of the present invention is characterized in that it further comprises the steps of defining a second family of surfaces with progressively variable curvature, so that each surface of the second family comprises a lower zone having an area at least equal to that of the whole of the intermediate zone and the lower zone of the surfaces of the first family and that, in its lateral parts, said lower zone of each surface of the second family comprises horizontal lines along which the vertical component of the prismatic effect is substantially constant, and a vertical line along which the horizontal component of the prismatic effect has a constant value and at each point of which the value of the vertical component of the prismatic effect differs at most by 0.7a in relation to the value of the vertical component of the prismatic effect at the point of said main meridian curve having the same vertical coordinate as the point considered of said vertical line, a representing said power addition, drawing up for each surface of the second family a table of deviations in relation to said reference sphere, associating each selected surface of the first family with each surface of the second family, determining for each pair of associated surfaces the points of intersection of the surfaces of the pair considered from their respective deviation tables, plotting the intersection curves for each pair of associated surfaces, selecting among the pairs of associated surfaces the pair of surfaces having two intersection curves which are each situated on a respective side of the main meridian curve and which are distant from each other by at least 15 mm in said intermediate zone and by at least 18 mm in said lower zone, and selecting as refractive surface for the ophthalmic lens a surface having an upper zone identical to that of the surface of the first family of the selected pair and a lower zone comprising a median part and two lateral parts separated from the median part by said intersection curves, the median part being identical to the part, situated between the two intersection curves, of the surface of the first family which constitutes one of the two surfaces of the selected pair of associated surfaces, and the two lateral parts being identical to the parts, situated outside the two intersection curves, of the surface of the second family which constitutes the other of the two surfaces of said selected pair.

The median part and the two lateral parts of the refractive surface thus obtained do not merge continuously along the two intersection curves which constitute inevitably lines of discontinuity. However, from the aesthetic point of view, these lines of discontinuity are less visible than the facets of the refractive surface shown in FIGS. 7 and 8 of French Pat. No. 1,095,375 and, furthermore, they may be partially removed or attenuated during polishing of the refraction surface.

BRIEF DESCRIPTION OF THE DRAWINGS

A detailed description will now be made of the present invention with reference to the accompanying drawings in which:

FIG. 4 is a chart showing the distribution of the astigmatism aberrations for the surface shown in FIG. 1.

FIG. 5 is the image of a regular grid seen through a lens having the refractive surface shown in FIG. 1.

FIG. 6 is a front view showing a surface of a second family of surfaces, used for preparing the refractive surface according to the present invention.

FIG. 7 is a graph showing the laws of variation respectively of the tangential power and of the sagittal power of the main meridian curve of the surface shown in FIG. 6.

FIG. 8 shows the profiles and the relative positions of the main meridian curves of the surface shown in FIGS. 1 and 6.

FIG. 9 is a front view showing the refractive surface of the invention, which is obtained from the surfaces shown in FIGS. 1 and 6.

FIGS. 10 to 12 show sections of the surface shown in FIG. 9 through planes perpendicular to the main meridian curve, the sections being taken respectively along lines X—X, XI—XI and XII—XII.

FIG. 13 is a chart showing the distribution of the astigmatism aberrations of the surface shown in FIG. 9.

FIG. 14 shows the image of a regular grid seen through a lens having the refractive surface shown in FIG. 9.

Figure 1:
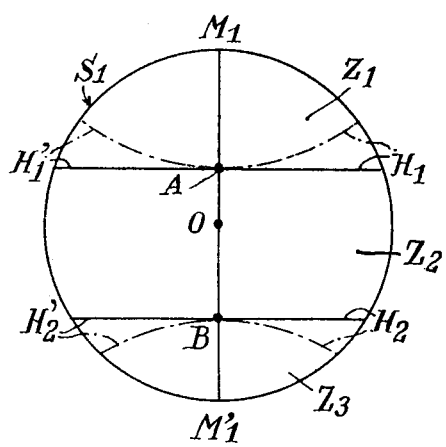
FIG. 1 is a front view showing a surface of a first family of surfaces, used for preparing the refractive surface according to the invention.

To obtain the refractive surface in accordance with the present invention, we begin by defining a first family of surfaces $S_1$ having a general shape such as that shown in FIG. 1. To this end, we begin by defining the shape of the main meridian curve $M_1M_1'$ of the surfaces $S_1$ of said first family, all the surfaces $S_1$ having the same main meridian curve $M_1M_1'$. In the example which follows, it will be assumed that the surfaces $S_1$ are convex surfaces. In this case, if R designates the radius of curvature of the main meridian curve $M_1M_1'$, the curvature $1/R$ of the curve $M_1M_1'$ may vary according to a predetermined law such as that shown by curve $P_1$ in FIG. 2. For example, the curvature $1/R$ may remain constant or substantially constant along the part $M_1A$ of curve $M_1M_1'$, then increase gradually from point A to point B according to the law defined by curve $P_1$ so as to provide a power addition of 2.00 D, and finally to remain constant or substantially constant in the part $BM_1'$ of curve $M_1M_1'$. If the surfaces $S_1$ had been concave surfaces, the curvature $1/R$ would have decreased from point A to point B.

Figure 2:
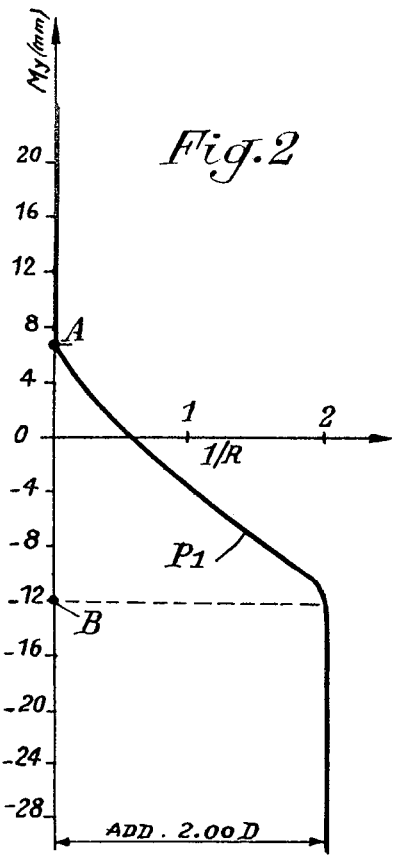
FIG. 2 is a graph showing a possible law of variation of the tangential focal power along the main meridian curve of the surface shown in FIG. 1.

The shape of the main meridian curve $M_1M_1'$ having been thus determined, we then define the shape of the surfaces $S_1$ of the first family so that each surface $S_1$ comprises, as shown in FIG. 1, an upper zone $Z_1$ for distant vision, having a constant or substantially constant focal power corresponding to the constant or substantially constant curvature of the part $M_1A$ of the main meridian curve $M_1M_1'$, a lower zone $Z_3$ for near vision, having a constant or substantially constant focal power corresponding to the constant or substantially constant curvature of the part $BM_1'$ of the main meridian curve $M_1M_1'$, and an intermediate zone $Z_2$ for vision at distances between the distance of distant vision and the distance of near vision, having a focal power which varies gradually along the part AB of the main meridian curve $M_1M_1'$ in correspondence with the law of variation of the curvature shown by curve $P_1$ in FIG. 2.

By substantially constant focal power in the zones $Z_1$ and $Z_3$, is meant a focal power whose value does not deviate more than 0.12 D in relation to the focal power on the corresponding parts $M_1A$ and $BM_1'$ of the main meridian curve $M_1M_1'$. The intermediate zone $Z_2$ is connected continuously with zones $Z_1$ and $Z_3$ respectively along lines $H_1'H_1$ and $H_2'H_2$. Although, in FIG. 1, lines $H_1'H_1$ and $H_2'H_2$ of surface $S_1$ have been shown in the form of straight lines (horizontal plane curves), these lines could be skew curves of surface $S_1$, as shown by dash-dot lines in FIG. 1.

The plane of the main meridian curve $M_1M_1'$ is a plane of symmetry for each surface $S_1$. In addition, the main meridian curve $M_1M_1'$ is an umbilic curve of surface $S_1$, that is to say that at each point of the main meridian curve $M_1M_1'$ the two main radii of curvature of surface $S_1$ are equal. Finally, although in FIG. 1 the main meridian curve $M_1M_1'$ has been shown in a vertical position, this curve may be slightly inclined in relation to the vertical as described in French Pat. No. 1,509,090.

The surfaces $S_1$ of the first family may be surfaces of the type shown in FIGS. 1 and 2 of French Pat. No. 1,095,375, or of the type shown in FIGS. 1 and 2 of French Pat. No. 1,544,799. In this case, the zones $Z_1$ and $Z_3$ of the surfaces $S_1$ of the first family have a spherical form and the sections $H_1'H_1$ and $H_2'H_2$ through planes perpendicular to the main meridian curve $M_1M_1'$ have a circular shape with radii equal to the radii of curvature of curve $M_1M_1'$ respectively at point A and point B. Furthermore, the sections of the intermediate zone $Z_2$ through planes perpendicular to the main meridian curve $M_1M_1'$ have circular shapes with radii which vary from the value of the radius of the circular section $H_1'H_1$ at the upper limit of zone $Z_2$ to the value of the radius of the circular section $H_2'H_2$ at the lower limit of zone $Z_2$. The surfaces $S_1$ may also be spherical surfaces of the type described in French Pat. No. 2,058,499 and in its first certificate of addition Pat. No. 2,079,663. In this case, the sections through planes perpendicular to the main meridian curve $M_1M_1'$ have the form of conic sections, each conic section having at its point of intersection with the main meridian curve $M_1M_1'$ a radius of curvature equal to that of the curve $M_1M_1'$ at the point of intersection considered.

Figure 3:
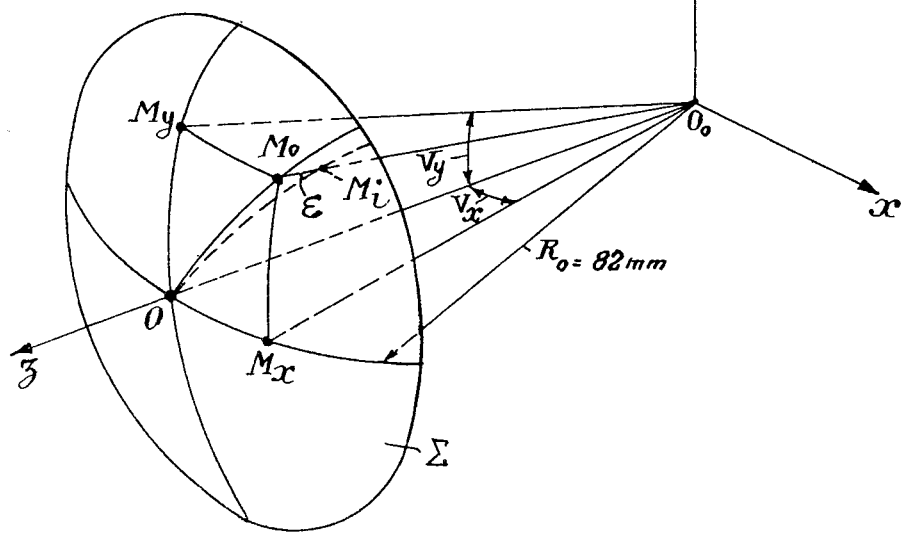
FIG. 3 shows the system of coordinates and the reference sphere which are used for determining the surfaces.

The surfaces $S_1$ of the first family having been thus defined, we draw up, for each surface $S_1$, a table of deviations in relation to a reference sphere $\Sigma$. As shown in FIG. 3, in the embodiment described here, the reference sphere $\Sigma$ has a radius $R_0$ equal to 82 mm and each point $M_i$ of the surface $S_1$ considered is fixed, on the one hand, by its discrepancy or deviation $\epsilon$ in relation to the reference sphere $\Sigma$, i.e. by the distance $M_OM_i$ measured on the radius $O_OM_O$ of the reference sphere $\Sigma$ passing through point $M_i$ and, on the other hand, by the lengths of the arcs $OM_x$ and $OM_y$ corresponding to the point $M_O$, these arcs being measured along the horizontal and vertical curves of intersection of the reference sphere $\Sigma$ respectively by the planes $OO_o$ and $yO_oz$. To draw up the deviation table for each surface $S_1$ of the first family, we calculate by means of a computer the deviation $\epsilon$ for a great number of points $M_i$ evenly spaced horizontally and vertically over surface $S_1$. The computer also supplies for each point $M_i$ of surface $S_1$ at the point considered. From these values, it is possible to calculate by means of the computer the value of the astigmatism at each point $M_i$ of the surface $S_1$ considered. We can then plot for each surface $S_1$ of the first family a chart of astigmatism aberrations, each chart showing the lines of iso-astigmatism of the surface $S_1$ considered. From the charts thus plotted, we select among the surfaces $S_1$ of the first family those whose strong astigmatism aberrations are concentrated in the outer lateral parts of the intermediate zone $Z_2$. FIG. 4 shows by way of example the chart of astigmatism aberrations for one of the selected surfaces $S_1$ of the first family. In FIG. 4, there is only shown half of the surface $S_1$ since the latter is symmetrical in relation to the plane of the main meridian curve $M_1M_1'$.

FIG. 5 shows the image of a regular grid seen through a lens, of which one of the two surfaces of refraction is formed by the surface $S_1$ having the chart of astigmatism aberrations which is shown in FIG. 4. Here again, there is only shown half of the image of the grid since the latter is symmetrical in relation to the left hand vertical line of the distorted grid shown in FIG. 5, said left hand line corresponding to the line of the grid situated in the plane of the main meridian curve $M_1M_1'$. As can be seen, the vertical and horizontal lines of the grid are greatly distorted in the right hand lower zone of the grid. In other words, surface $S_1$ presents heavy oblique distortion in the outer lateral parts of the intermediate zone $Z_2$.

In Table 1 below, there is shown the value of deviation $\epsilon$ in mm of surface $S_1$ corresponding to FIGS. 4 and 5 in relation to the reference sphere $\Sigma$ of FIG. 3. Here again, Table 1 only gives the deviations for a half of the surface $S_1$ since the latter is symmetrical in relation to the plane of the main meridian curve $M_1M_1'$. In Table 1, the deviations $\epsilon$ of the surface $S_1$ in relation to the reference sphere $\Sigma$ are given for points spaced horizontally and vertically spart every 4 mm, i.e. by varying the arc $OM_x$ and $OM_y$ (FIG. 3) every 4 mm, which corresponds to an angular pitch of 2°47′34″ for a reference sphere having a radius $R_O$ of 82 mm. In table 1, there is also shown in the thickly outlined boxes, deviations $\epsilon$ corresponding to other points of surface $S_1$, the usefulness of which will be seen further on. Although table 1 gives the value of the deviations $\epsilon$ for a relatively small number of points of surface $S_1$, in practice, we draw up for each surface $S_1$ a deviation table for a much greater number of points, for example 2000 to 3000 points.

TABLE I

| $M_y$ \ $M_x$ | 0 | 4 | 8 | 10,29 | 10,45 | 11,42 | 11,71 | 12 | 12,25 | 12,53 | 12,71 | 12,87 | 15,64 | 16 | 20 | 24 | 28 | 32 |
|---|---|---|---|---|---|---|---|---|---|---|---|---|---|---|---|---|---|---|
| 32 | 0,0968 | 0,0968 | 0,0968 | | | | | 0,0968 | | | | | | 0,0989 | | | | |
| 28 | 0,0840 | 0,0840 | 0,0840 | | | | | 0,0840 | | | | | | 0,0861 | 0,0905 | | | |
| 24 | 0,0712 | 0,0712 | 0,0712 | | | | | 0,0712 | | | | | | 0,0733 | 0,0777 | 0,0907 | | |
| 20 | 0,0584 | 0,0584 | 0,0584 | | | | | 0,0584 | | | | | | 0,0605 | 0,0649 | 0,0779 | 0,0983 | |
| 16 | 0,0456 | 0,0456 | 0,0456 | | | | | 0,0456 | | | | | | 0,0477 | 0,0521 | 0,0651 | 0,0855 | |
| 12 | 0,0328 | 0,0328 | 0,0328 | | | | | 0,0331 | | | | | | 0,0357 | 0,0406 | 0,0542 | 0,0745 | 0,0973 |
| 8 | 0,0200 | 0,0200 | 0,0205 | | | | | 0,0220 | | | | | | 0,0261 | 0,0341 | 0,0476 | 0,0678 | 0,0906 |
| 4 | 0,0072 | 0,0093 | 0,0129 | | | | | 0,0183 | | | | | | 0,0263 | 0,0377 | 0,0525 | 0,0727 | 0,0955 |
| 0 | 0,0000 | 0,0072 | 0,0200 | | | | | 0,0376 | | | | 0,0534 | | 0,0550 | 0,0710 | 0,0874 | 0,1072 | 0,1300 |
| −4 | 0,0106 | 0,0266 | 0,0680 | | 0,2031 | | 0,1061 | 0,1090 | | | | | | 0,1455 | 0,1727 | 0,1971 | 0,2196 | 0,2433 |
| −8 | 0,0536 | 0,0783 | 0,1500 | 0,3467 | | | | 0,2380 | | | | | | 0,3195 | 0,3875 | 0,4419 | 0,4866 | 0,5204 |
| −12 | 0,1466 | 0,1769 | 0,2676 | | | 0,5480 | | 0,4130 | | | | | | 0,5581 | 0,6774 | 0,7705 | 0,8401 | 0,8851 |
| −16 | 0,3001 | 0,3304 | 0,4211 | | | | | 0,5722 | | | | | | 0,7592 | 0,9237 | 1,0569 | 1,1514 | 1,2067 |
| −20 | 0,5140 | 0,5443 | 0,6350 | | | | | 0,7861 | 0,7983 | | | | | 0,9997 | 1,1607 | 1,3053 | 1,4072 | |
| −24 | 0,7883 | 0,8186 | 0,9093 | | | | | 1,0604 | | | 1,0955 | | | 1,2540 | 1,4350 | 1,5796 | | |
| −28 | 1,1230 | 1,1533 | 1,2440 | | | | | 1,3951 | | | | 1,4376 | | 1,5887 | 1,7697 | | | |
| −32 | 1,5181 | 1,5484 | 1,6391 | | | | | 1,7902 | | 1,8162 | | | | 1,9838 | | | | |

For preparing the refractive surface according to the present invention, we then define a second family of surfaces $S_2$ having a general shape such as that shown in FIG. 6. To this end, we begin by defining the shape of the main meridian curve $M_2M_2'$, which may or may not be the same for all the surfaces $S_2$ of the second family. The curve $P_{2t}$ of FIG. 7 shows by way of example a possible law of variation of the curvature $1/R$ of the main meridian curve $M_2M_2'$, i.e. of the tangential power along this curve $M_2M_2'$. In FIG. 8, there is shown the profiles of the main meridian curves $M_1M_1'$ and $M_2M_2'$ and their relative positions in relation to the reference sphere $\Sigma$. Since, as we will see further on, the surfaces $S_1$ of the first family and the surfaces $S_2$ of the second family must be able to give rise to intersection curves, the curvature of the sections of surfaces $S_2$ through planes perpendicular to the main meridian curve $M_2M_2'$ must be smaller than the curvature of the corresponding sections of surfaces $S_1$. In general, the main meridian curve $M_2M_2'$ will not be an umbilic curve, that is to say that at each point of curve $M_2M_2'$ the horizontal and vertical radii of curvature will not be equal. The curve $P_{2s}$ of FIG. 7 shows by way of example a possible law of variation of the horizontal curvature, i.e. of the sagittal power, along the main meridian curve $M_2M_2'$.

The shape of the main meridian curve(s) $M_2M_2'$ of the surfaces $S_2$ of the second family having been thus determined, we then define the surfaces $S_2$ of the second family, so that each surface $S_2$ comprises an upper zone $Z_4$, and a lower zone $Z_5$ which has a surface area at least equal to that of the whole of zones $Z_2$ and $Z_3$ of surfaces $S_1$ of the first family. The upper zone $Z_4$ which is situated above the plane or skew line $H_3H_3'$ may be spherical or aspherical. The lower zone $Z_5$ of each surface $S_2$ is defined so that it presents, in its lateral parts, horizontal lines $L_1L_1'$, $L_2L_2'$ ... $L_7L_7'$ along each of which the vertical component of the prismatic effect has a substantially constant value. In other words, along each line $L_1L_1'$, ..., $L_7L_7'$ the plane tangential to surface $S_2$ forms a substantially constant angle with the horizontal plane passing through the optical center O. The result will be that the images of the horizontal lines of a regular grid seen through surface $S_2$ will be practically not distorted or little distorted. Furthermore, the lower zone $Z_5$ of each surface is defined so that it presents, in each of its lateral parts, a vertical line $V_1V_1'$ or $V_2V_2'$, respectively, along which the horizontal component of the prismatic effect has a constant value and at each point of which the value of the vertical component of the prismatic effect does not differ by more than 0.7 a in relation to the value of the vertical component of the prismatic effect at the point of the main meridian curve $M_1M_1'$ of surfaces $S_1$ having the same vertical coordinate as the point considered of the vertical line $V_1V_1'$ or $V_2V_2'$, a representing the power addition between points A and B of the main meridian curve $M_1M_1'$. In other words, along vertical lines $V_1V_1'$ and $V_2V_2'$ the plane tangential to surface $S_2$ forms a constant angle with the plane of the main meridian curve $M_2M_2'$. The result will be that the image of the vertical line seen through surface $S_2$ and corresponding to the vertical line $V_1V_1'$ or $V_2V_2'$ will remain a vertical line. For example, the vertical lines $V_1V_1'$ and $V_2V_2'$ may be spaced 20 mm away from the main meridian curve $M_2M_2'$. The purpose of the condition according to which the value of the vertical component of the prismatic effect at each point of the vertical lines $V_1V_1'$ and $V_2V_2'$ must not deviate more than 0.7 a in relation to the value of the vertical component of the prismatic effect at the corresponding point of the main meridian curve $M_1M_1'$ is to obtain images of the horizontal lines of a regular grid seen through the lateral parts of the surface $S_2$ which present no or little shift in the vertical direction in relation to the images of the horizontal lines of the same grid seen through the central part of the intermediate zone $Z_2$ of surface $S_1$.

The surfaces $S_2$ of the second family having been thus defined, we draw up, for each surface $S_2$, a table of deviations in relation to the reference sphere $\Sigma$ (FIG. 3) in the same way as for each of surfaces $S_1$. The table 2 below gives by way of example the value of the deviations $\epsilon$ of a surface $S_2$ of the second family in the reference system of FIG. 3, this surface $S_2$ having a main meridian curve $M_2M_2'$ whose curvature varies as shown in FIG. 7.

TABLE II

| $M_y$ \ $M_x$ | 0 | 4 | 8 | 10,29 | 10,45 | 11,42 | 11,71 | 12 | 12,25 | 12,53 | 12,71 | 12,87 | 15,64 | 16 | 20 | 24 | 28 | 32 |
|---|---|---|---|---|---|---|---|---|---|---|---|---|---|---|---|---|---|---|
| 32 | 0,1502 | 0,1502 | 0,1502 | | | | | 0,1502 | | | | | | 0,1523 | | | | |
| 28 | 0,1272 | 0,1272 | 0,1272 | | | | | 0,1272 | | | | | | 0,1293 | 0,1337 | | | |
| 24 | 0,1041 | 0,1041 | 0,1041 | | | | | 0,1041 | | | | | | 0,1062 | 0,1106 | 0,1236 | | |
| 20 | 0,0810 | 0,0810 | 0,810 | | | | | 0,0810 | | | | | | 0,0831 | 0,0875 | 0,1005 | 0,1209 | |
| 16 | 0,0581 | 0,0581 | 0,0581 | | | | | 0,0581 | | | | | | 0,0602 | 0,0646 | 0,0776 | 0,0980 | 0,1208 |
| 12 | 0,0373 | 0,0373 | 0,0373 | | | | | 0,0376 | | | | | | 0,0402 | 0,0451 | 0,0587 | 0,0790 | 0,1018 |
| 8 | 0,0227 | 0,0227 | 0,0227 | | | | | 0,0227 | | | | | | 0,0268 | 0,0348 | 0,0483 | 0,0685 | 0,0913 |
| 4 | 0,0207 | 0,0207 | 0,0207 | | | | | 0,0207 | | | | | | 0,0263 | 0,0377 | 0,0525 | 0,0727 | 0,0955 |
| 0 | 0,0393 | 0,0393 | 0,0395 | | | | | 0,0457 | | | | | 0,0534 | 0,0542 | 0,0654 | 0,0805 | 0,1000 | 0,1219 |
| -4 | 0,0884 | 0,0904 | 0,0967 | | | | 0,1061 | 0,1069 | | | | | | 0,1190 | 0,1314 | 0,1453 | 0,1616 | 0,1796 |
| -8 | 0,1766 | 0,1808 | 0,1927 | | 0,2031 | | | 0,2104 | | | | | | 0,2300 | 0,2453 | 0,2563 | 0,2663 | 0,2774 |
| -12 | 0,3081 | 0,3144 | 0,3322 | 0,3467 | | | | 0,3587 | | | | | | 0,3882 | 0,4081 | 0,4145 | 0,4149 | 0,4161 |
| -16 | 0,4835 | 0,4920 | 0,5170 | | | 0,5480 | | 0,5536 | | | | | | 0,5937 | 0,6194 | 0,6200 | 0,6080 | 0,5962 |
| -20 | 0,7027 | 0,7136 | 0,7462 | | | | | 0,7950 | 0,7983 | | | | | 0,8479 | 0,8792 | 0,8742 | 0,8483 | |
| -24 | 0,9658 | 0,9794 | 1,0201 | | | | | 1,0829 | | | 1,0955 | | | 1,1507 | 1,1874 | 1,1770 | | |
| -28 | 1,2727 | 1,2892 | 1,3391 | | | | | 1,4184 | | | | 1,4376 | | 1,5021 | 1,5441 | | | |
| -32 | 1,6235 | 1,6439 | 1,7052 | | | | | 1,8019 | | 1,8162 | | | | 1,9012 | | | | |

Table 3 shows the value of the vertical component of the prismatic effect for different points of the main meridian curve $M_1M_1'$ of the surface $S_1$ corresponding to table 1, the value of the vertical component of the prismatic effect at the corresponding points of the vertical line $V_1V_1'$, situated at a distance of 20 mm from $M_2M_2'$ of surfaces $S_2$ corresponding to table 2, and the difference between these values at the corresponding points. The values of the vertical components of the prismatic effect are expressed in prismatic dioptres. It will be recalled that 1 prismatic dioptre corresponds to a deviation of a light ray of 1 cm over a path of 1 m.

TABLE III

| ARC My (mm) | Vertical component of the prismatif effect on $M_1M_1'$ of $S_1$ | Vertical component of the prismatic effect on $V_1V_1'$ de $S_2$ | Difference |
| --- | --- | --- | --- |
| 0 | 0 | 0,60 | 0,60 |
| −2 | 0,14 | 0,87 | 0,73 |
| −4 | 0,33 | 1,18 | 0,85 |
| −6 | 0,57 | 1,51 | 0,94 |
| −8 | 0,87 | 1,83 | 0,96 |
| −10 | 1,23 | 2,15 | 0,92 |
| −12 | 1,63 | 2,47 | 0,84 |
| −14 | 2,03 | 2,79 | 0,76 |
| −16 | 2,43 | 3,12 | 0,69 |
| −18 | 2,83 | 3,44 | 0,61 |
| −20 | 3,23 | 3,76 | 0,53 |
| −22 | 3,63 | 4,08 | 0,45 |
| −24 | 4,03 | 4,40 | 0,37 |
| −26 | 4,43 | 4,72 | 0,29 |
| −28 | 4,83 | 5,04 | 0,21 |
| −30 | 5,23 | 5,35 | 0,12 |

It will be noted that the values shown in the fourth column of table 3 are all less than 1 prismatic dioptre, that is to say less than 0.5 a, a being the power addition of the surface $S_1$, i.e. 2 dioptres in the example considered.

Having thus determined a plurality of surfaces $S_1$ of the first family and their respective deviation tables and having selected among surfaces $S_1$ those whose strong astigmatism aberrations are concentrated in the outer lateral parts of their intermediate zone $Z_2$, and having furthermore determined a plurality of surfaces $S_2$ of the second family and their respective deviation tables, we associate each selected surface $S_1$ of the first family with each surface $S_2$ of the second family as shown in FIG. 8, by placing $S_1$ and $S_2$ at a mutual distance $d_o$, measured on the optical axis, this distance $d_o$ being possibly zero. We then determine, for each pair of surfaces $S_1$ and $S_2$, the points of intersection of the surfaces of the pair considered by comparing the respective deviation tables of these two surfaces. For example, comparing the horizontal lines 0 of the two tables 1 and 2 above, we see that the two surfaces $S_1$ and $S_2$ corresponding to these two tables intersect at a point situated between the vertical columns 12 and 16. In fact, for each horizontal line of tables 1 and 2, i.e. for each horizontal section of the surfaces $S_1$ and $S_2$ of the pair considered, the computer supplies the coordinate $OM_x$ of the point of intersection of the two surfaces $S_1$ and $S_2$ along the horizontal section considered, as well as the value of the deviation $\epsilon$ of the point of intersection in relation to the reference sphere $\Sigma$. For example, for the horizontal section corresponding to the horizontal line 0 of tables 1 and 2, the length of the arc $OM_x$ corresponding to the point of intersection of the two surfaces $S_1$ and $S_2$ is equal to 15.64 mm and the deviation $\epsilon$ in relation to the reference sphere $\Sigma$ is equal to 0.0534 mm. Similarly, for the other horizontal sections corresponding to the horizontal lines −4, −8, −12, −16, −20, −24, −28 and −32 of tables 1 and 2, the lengths of the arcs $OM_x$ corresponding to the points of intersection of surfaces $S_1$ and $S_2$ are equal respectively to 11.71 mm, 10.45 mm, 10.29 mm, 11.42 mm, 12.25 mm, 12.71 mm, 12.87 mm and 12.53 mm. The values of the deviations $\epsilon$ at the points of intersection of surfaces $S_1$ and $S_2$ are shown in the thick-line boxes of tables 1 and 2.

Having thus determined the points of intersection of each pair of associated surfaces $S_1$ and $S_2$, we plot, for each pair of surfaces, the curves of intersection of the two surfaces of the pair considered. We obtain in general two curves of intersection disposed symmetrically in relation to the plane of the main meridian curve of the two surfaces. FIG. 9 shows the two curves of intersection C and D of the two surfaces $S_1$ and $S_2$ corresponding to tables 1 and 2. Having thus plotted the two curves of intersection for each pair of associated surfaces $S_1$ and $S_2$, we select among the pairs of associated surfaces the pair of surfaces giving two curves of intersection which are the farthest away in relation to the main meridian curve $M_1M_1'$. For example, we will select among the pairs of associated surfaces the pair whose curves of intersection C and D form together a corridor which has a width at least equal to 15 mm in the intermediate vision zone $Z_2$ and at least equal to 18 mm, preferably 20 mm, in the lower zone $Z_3$ so as to provide a wide lateral field of vision in the lower zone of the surface reserved for near vision. It will be noted that for the same pair of surfaces $S_1$ and $S_2$, we may obtain a wider or narrower corridor by varying the distance $d_o$.

Having thus selected the pair of surfaces $S_1$ and $S_2$ which give two curves of intersection C and D satisfying the conditions mentioned above, we select as surface of refraction for the ophthalmic lens a surface S having the structure shown in FIG. 9. More precisely, the surface S comprises an upper zone $Z_1$ idential to that of surface $S_1$ of the pair selected and a lower zone comprising a median part $Z_2' + Z_3'$ and two lateral parts $Z_5'$ separated from the median part by the curves of intersection C and D. The parts $Z_2'$ and $Z_3'$ of the median parts are identical to the corresponding parts, situated between the two curves of intersection C and D, of the intermediate zone $Z_2$ and the lower zone $Z_3$ of the surface $S_1$ of the pair selected, and the two lateral parts $Z_5'$ are identical to the corresponding parts, situated outside the two curves of intersection C and D, of the surface $S_2$ of the pair selected. FIGS. 10 to 12 show different horizontal sections of the surface S through planes perpendicular to the main meridian curve $M_1M_1'$. The horizontal sections of the lower zone of the surface S have a median part which corresponds to the median part $Z_2'$ or $Z_3'$ of FIG. 9 and which is more curved than the lateral parts of said horizontal sections which correspond to the lateral parts $Z_5'$ of FIG. 9. This arises from the fact that the horizontal sections of the lower zones $Z_5$ of surface $S_2$ have a smaller curvature than the horizontal sections of the intermediate zone $Z_2$ and of the lower zone $Z_3$ of surface $S_1$. Furthermore, the curves of intersection C and D form lines of discontinuity of surface S as is clearly visible at points E, F, G, H, K and L in FIGS. 10 to 12. As can be seen, these discontinuities are much less pronounced than the two stepped discontinuities existing on the refractive surface of the lens shown in FIGS. 7 and 8 of French Pat. No. 1,095,375.

FIG. 13 illustrates the distribution of the astigmatism aberrations in the right hand half of surface S, the latter being assumed to have been obtained from surfaces $S_1$ and $S_2$ whose deviation tables 1 and 2 were given here above. FIG. 14 shows the image of the half of a regular grid seen through the half of the surface S shown in FIG. 13. As can be seen in FIG. 14, in the lower part of the grid, the images of the horizontal lines remain substantially horizontal, are little distorted and present practically no shift in the vertical direction in the region of the curve of intersection D. Furthermore, the image of the vertical line 20, which corresponds to the vertical line $V_1V_1'$ of surface $S_2$, remains perfectly vertical.

Assuming that the pair of surfaces $S_1$ and $S_2$ which was selected for forming surface S is constituted by surfaces $S_1$ and $S_2$ whose deviation tables 1 and 2 were given above, the deviation table of surface S is obtained in the following way. The horizontal lines 32, 28, 24, 20, 16, 12, 8 and 4 of the deviation table of surface S will comprise the same value as the corresponding lines of table 1, whereas each horizontal line 0, $-4$, $-8$, $-12$, $-16$, $-20$, $-24$, $-28$ and $-32$ of the deviation table of surface S will comprise the deviation values which are at the left of the thick-line box of the corresponding line of table 1, and the deviation values which are at the right of the thick-line box of the corresponding line of table 2. For example, the horizontal line 0 of the deviation table for surface S will comprise from left to right the following values:

0.0000; 0.0072; 0.0200; 0.0376; $\boxed{0.0534}$ .
0.0542; 0.0654; 0.0805; 0.1000; 0.1219.

From the deviation table of surface S, the desired surface can be made in the following way. If the desired surface S is convex, we make first of all a concave model of the surface S which is cut, for example in a flock of material for obtaining a mold by means of a known machine equipped with a diamond grinding wheel and which possesses a system of reference identical to that of FIG. 3. From the concave model thus obtained, we then reproduce the desired convex surface S as often as desired by casting a polymerizable material in the mold which forms the concave model. We can also obtain the desired convex surface S by thermal collapse of a block of refringent material on the concave model. If the desired surface S is concave, we can cut it directly from a block of refringent material by means of said machine equipped with a diamond grinding wheel. However, it is generally preferred to cut a concave model of the desired surface from a special block of steel by means of said machine equipped with a diamond grinding wheel. From the concave model thus obtained, we can reproduce the desired concave surface S as often as desired from blocks of refringent material by means of a known copying machine. From the concave model, we can also obtain by molding a convex model of the desired surface, which will serve itself as a mold for obtaining a concave surface by casting a polymerizable material or by thermal collapse of a block of refringent material.

The desired surface S thus obtained is then ground down to the desired smoothness, then polished in a conventional way by means of one or more flexible polishers. It is at this stage of manufacture of the refractive surface that the lines of discontinuity C and D may be partly obliterated or attenuated.

There will now be described a second embodiment of a refractive surface according to the present invention. In this second example, the surfaces $S_1$ of the first family and the surfaces $S_2$ of the second family have again the same general structures as those shown respectively in FIGS. 1 and 6, and they are defined in a similar way.

Figure 15:
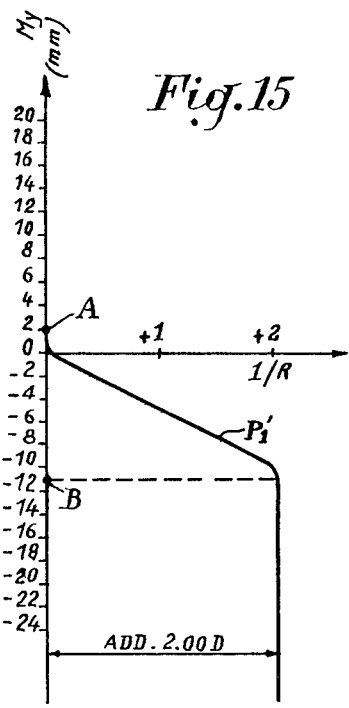
FIG. 15 is a graph similar to that of FIG. 2, showing another possible law of variation of the tangential focal power along the main meridian curve of the surface shown in FIG. 1.

To define the first family of surface $S_1$, we begin, as in the preceding example, by defining the shape of the umbilic main meridian curve $M_1M_1'$. For example, the curvature $1/R$ of the curve $M_1M_1'$ may vary according to a predetermined law such as the one shown by curve $P_1'$ in FIG. 15. However, in this case, we cause surfaces $S_1$ of the first family to have a strictly constant focal power in their upper zone $Z_1$ (FIG. 1), i.e. that their upper zone $Z_1$ has the shape of a portion of a sphere. Preferably, we select the radius of curvature of the upper zone $Z_1$ equal to radius $R_o$ of the sphere of reference $\Sigma$, for example 82 mm.

As in the preceding example, we draw up, for each surface $S_1$ complying with the conditions mentioned above and having the general structure shown in FIG. 1, a table of deviations in relation to the sphere of reference $\Sigma$ of radius $R_o$. For each surface $S_1$ we plot the chart of astigmatism aberrations and, from the charts thus plotted, we select among the surfaces $S_1$ of the first family those whose strong astigmatism aberrations are concentrated in the outer lateral parts of the intermediate zone $Z_2$.

Table 4 below gives by way of example the value of deviations $\Sigma$ in mm of a selected surface $S_1$ of the first family in relation to the sphere of reference $\Sigma$ of radius $R_0 = 82$ mm.

TABLE IV

| $M_y$\\$M_x$ | 0 | 4 | 8 | 8,93 | 9,64 | 9,98 | 11,08 | 11,94 | 12 | 13,54 | 14,01 | 14,43 | 16 | 20 | 24 | 28 | 32 |
|---|---|---|---|---|---|---|---|---|---|---|---|---|---|---|---|---|---|
| 32 | 0 | | | | | | | | 0 | | | | | | | | 0 |
| 28 | 0 | | | | | | | | 0 | | | | | | | 0 | 0 |
| 24 | 0 | | | | | | | | 0 | | | | | | 0 | 0 | 0 |
| 20 | 0 | | | | | | | | 0 | | | | | 0 | 0 | 0 | 0 |
| 16 | 0 | | | | | | | | 0 | | | | | 0 | 0 | 0 | 0 |
| 12 | 0 | | | | | | | | 0 | | | | | 0 | 0 | 0 | 0 |
| 8 | 0 | | | | | | | | 0 | | | | | 0 | 0 | 0 | 0 |
| 4 | 0 | | | | | | | | 0 | | | | | 0 | 0 | 0 | 0 |
| 0 | 0,0000 | 0 | 0 | | | | | | 0 | | | | 0 | 0 | 0 | 0 | 0 |
| −4 | 0,0030 | 0,0151 | 0,0407 | | | | | | 0,0603 | | | | 0,0678 | 0,0680 | 0,0680 | 0,0680 | 0,0680 |
| −8 | 0,0302 | 0,0545 | 0,1202 | 0,1381 | | | | | 0,1934 | | | | 0,2383 | 0,2533 | 0,2570 | 0,2570 | 0,2570 |
| −12 | 0,1058 | 0,1360 | 0,2266 | | 0,0500 | | | | 0,3547 | | | | 0,4621 | 0,5254 | 0,5537 | 0,5650 | 0,5670 |
| −16 | 0,2419 | 0,2721 | 0,3627 | | | 0,2892 | | 0,5111 | 0,5138 | | | | 0,6858 | 0,8278 | 0,9182 | 0,9648 | 0,9857 |
| −20 | 0,4385 | 0,4687 | 0,5593 | | | | | | 0,7104 | 0,7844 | | | 0,9164 | 1,1302 | 1,2969 | 1,4046 | |
| −24 | 0,6955 | 0,7257 | 0,8163 | | | | | | 0,9674 | | | 1,0848 | 1,1790 | 1,4326 | 1,6597 | | |
| −28 | 1,0130 | 1,0432 | 1,1338 | | | | | | 1,2849 | | 1,3838 | | 1,4965 | 1,7501 | | | |
| −32 | 1,3910 | 1,4212 | 1,5118 | | | | 1,6246 | | 1,6629 | | | | 1,8736 | | | | |

Figure 16:
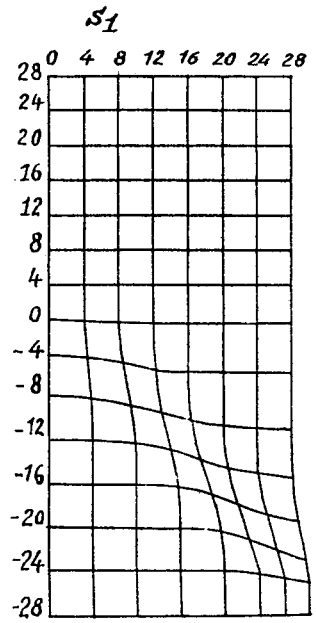
FIG. 16 shows an image similar to that of FIG. 5 in the case of a surface corresponding to the graph of FIG. 15.
Figure 17:
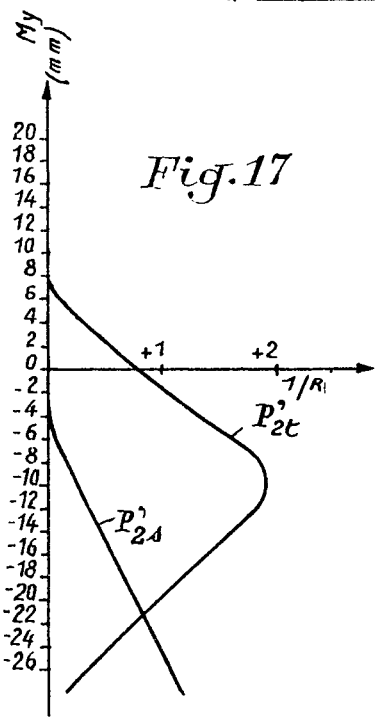
FIG. 17 is a graph similar to that of FIG. 7 in the case of another surface of the second family.

FIG. 16 shows the image of a regular grid seen through a lens of which one of the two surfaces of refraction is formed by the selected surface $S_1$ corresponding to table 4 given above.

To define surfaces $S_2$ (FIG. 6) of the second family, we proceed as in the preceding example, the vertical and horizontal curvatures along the main meridian curve $M_2M_2'$ varying respectively according to predetermined laws such as those shown respectively by curves $P_{2r}'$ and $P_{2s}'$ in FIG. 16. However, in this case, we cause surfaces $S_2$ of the second family to have an upper zone $Z_4$ which is spherical in shape and has the same radius of curvature $R_0$ as the upper zone $Z_1$ of surfaces $S_1$ of the first family.

As in the preceding example, we draw up, for each surface $S_2$ complying with the conditions mentioned above and having the general structure of FIG. 6, a table of deviations in relation to the sphere of reference $\Sigma$ of radius $R_o$. Table 5 below gives by way of example the value of the deviations $\epsilon$ in mm of a surface $S_2$ of the second family.

TABLE V

| $M_y$ \ $M_x$ | 0 | 4 | 8 | 8,93 | 9,64 | 9,98 | 11,08 | 11,94 | 12 | 13,54 | 14,01 | 14,43 | 16 | 20 | 24 | 28 | 32 |
|---|---|---|---|---|---|---|---|---|---|---|---|---|---|---|---|---|---|
| 32 | 0 | 0 | 0 | | | | | | 0 | | | | | | | | |
| 28 | 0 | 0 | 0 | | | | | | 0 | | | | | | | | 0 |
| 24 | 0 | 0 | 0 | | | | | | 0 | | | | | | | 0 | 0 |
| 20 | 0 | 0 | 0 | | | | | | 0 | | | | | | 0 | 0 | 0 |
| 16 | 0 | 0 | 0 | | | | | | 0 | | | | | 0 | 0 | 0 | 0 |
| 12 | 0 | 0 | 0 | | | | | | 0 | | | | 0,0041 | 0 | 0 | 0 | 0 |
| 8 | 0 | 0 | 0 | | | | | | 0 | | | | 0,0495 | 0,0495 | 0,0485 | 0,0457 | 0,0427 |
| 4 | 0,0020 | 0,0017 | 0,0009 | | | | | | 0,0081 | | | | 0,0495 | 0,0495 | 0,0485 | 0,0457 | 0,0427 |
| 0 | 0,0144 | 0,0189 | 0,0117 | | | | | | 0,0495 | | | | 0,1587 | 0,1636 | 0,1587 | 0,1479 | 0,1363 |
| −4 | 0,0505 | 0,0505 | 0,0502 | | 0,0500 | | | | 0,1463 | | | | 0,3281 | 0,3380 | 0,3281 | 0,3065 | 0,2833 |
| −8 | 0,1261 | 0,1289 | 0,1357 | 0,1381 | | | | | 0,3029 | | | | 0,5505 | 0,5661 | 0,5505 | 0,5158 | 0,4968 |
| −12 | 0,2560 | 0,2617 | 0,2775 | | | 0,2892 | | | 0,5118 | | | | 0,8146 | 0,8367 | 0,8146 | 0,7645 | |
| −16 | 0,4404 | 0,4487 | 0,4736 | | | | | 0,5111 | 0,7628 | | | | 1,1092 | 1,1376 | 1,1092 | | |
| −20 | 0,6676 | 0,6791 | 0,7127 | | | | | | 1,0429 | 0,7844 | | | 1,4219 | 1,4566 | 1,5265 | | |
| −24 | 0,9248 | 0,9392 | 0,9810 | | | | | | 1,3413 | | | 1,0848 | 1,7406 | | | | |
| −28 | 1,1990 | 1,2162 | 1,2666 | | | | | | 1,6461 | | 1,3838 | | | | | | |
| −32 | 1,4780 | 1,4984 | 1,5579 | | | | 1,6246 | | | | | | | | | | |

Table 6 below is a table similar to Table 3, but it corresponds to surfaces $S_1$ and $S_2$ defined respectively by tables 4 and 5.

TABLE VI

| ARC My (mm) | Vertical component of the prismatic effect on $M_1M_1'$ of $S_1$ | Vertical component of the prismatic effect on $V_1V_1'$ of $S_2$ | Difference |
| --- | --- | --- | --- |
| 0 | 0 | 0.22 | 0.22 |
| −2 | 0.04 | 0.65 | 0.61 |
| −4 | 0.16 | 1.09 | 0.93 |
| −6 | 0.36 | 1.51 | 1.15 |
| −8 | 0.64 | 1.91 | 1.27 |
| −10 | 1.00 | 2.31 | 1.31 |
| −12 | 1.40 | 2.68 | 1.28 |
| −14 | 1.80 | 3.02 | 1.22 |
| −16 | 2.20 | 3.32 | 1.12 |
| −18 | 2.60 | 3.58 | 0.98 |
| −20 | 3.00 | 3.80 | 0.80 |
| −22 | 3.40 | 3.98 | 0.58 |
| −24 | 3.80 | 4.12 | 0.32 |
| −26 | 4.20 | 4.22 | 0.02 |
| −28 | 4.60 | 4.28 | −0.32 |
| −30 | 5.00 | 4.30 | −0.70 |

It will be noted that the values shown in the fourth column of table 6 are all less than 1.4 prismatic dioptre, that is to say less than 0.7 a, a being the power addition of surface $S_1$, i.e. 2 dioptres in the example considered.

Figure 18:
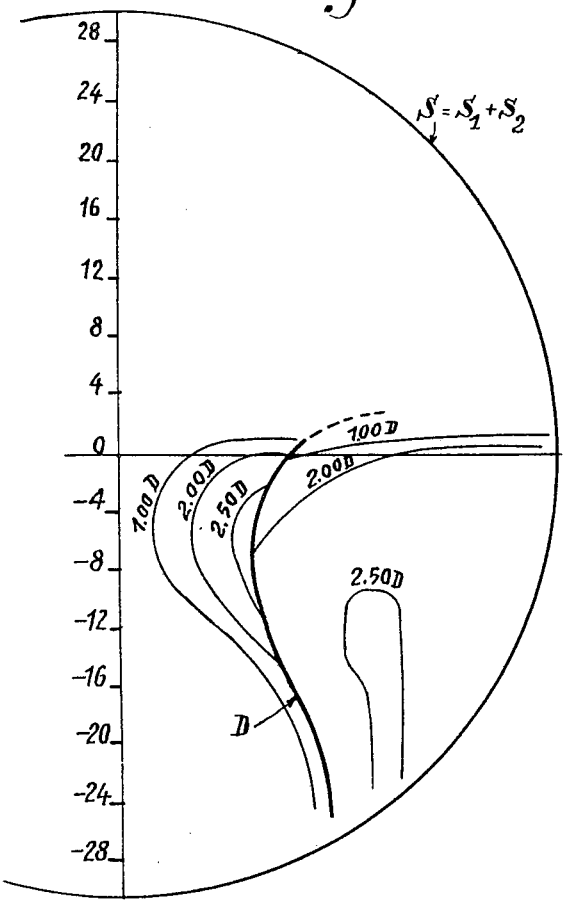
FIG. 18 is a chart similar to that of FIG. 13 in the case of a refractive surface obtained from the two surfaces corresponding to the graphs of FIGS. 15 and 17.
Figure 19:
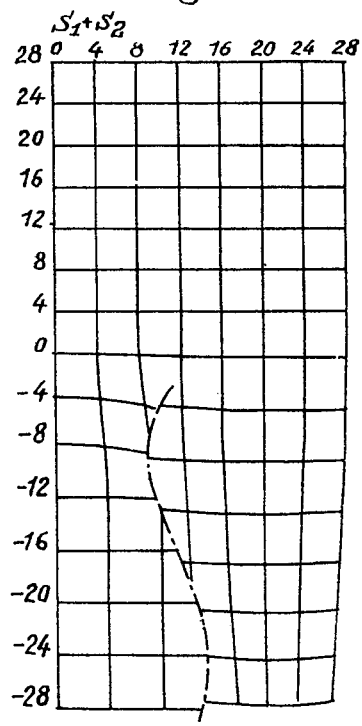
FIG. 19 shows an image similar to that of FIG. 14 in the case of the refractive surface corresponding to FIG. 18.

Then, to obtain surface S (FIG. 9) according to the present invention, we proceed exactly in the same way as in the preceding example. It will be assumed that the pair of surfaces $S_1$ and $S_2$ which is selected to form surfaces S is constituted by surfaces $S_1$ and $S_2$ whose deviation tables 4 and 5 were given above. In these two tables, the boxes drawn in thick line correspond to the points of intersection of the two surfaces $S_1$ and $S_2$. FIG. 18 shows the shape of one of the two curves of intersection D of surfaces $S_1$ and $S_2$ corresponding to tables 4 and 5, and it also shows the iso-astigmatism curves of a half of the surface S obtained from these two surfaces $S_1$ and $S_2$. FIG. 19 shows the image of a half of a regular grid seen through the half of surface S shown in FIG. 18.

Of course, the embodiments which have been described above have been given purely by way of indication and are in no wise limiting. Thus it is possible to cause surfaces $S_2$ of FIG. 6 to have a line $H_3H_3'$ identical in form and in position to line $H_1H_1'$ of surfaces $S_1$ of FIG. 1, and to have at each point of this line $H_3H_3'$ a derivative $(\partial z/\partial y)$ identical to that of the corresponding point of line $H_1H_1'$, so that surfaces $S_1$ and $S_2$ merge continuously along a common line $(H_1H_1'=H_3H_3')$. Furthermore, we assumed, in the first embodiment, that the upper zones $Z_1$ and $Z_4$ were not identical and, in the second embodiment, that these two zones $Z_1$ and $Z_4$ were identical and strictly spherical, but they may also be identical without being strictly spherical.

What is claimed is:

1. A progressively variable focal power ophthalmic lens, comprising a surface of refraction which includes a substantially vertical main meridian curve having a curvature which varies progressively in accordance with a predetermined law along at least a part of said main meridian curve, an upper zone having a first substantially constant focal power for distant vision, a lower zone having a second substantially constant focal power for near vision and an intermediate zone situated between the upper and lower zones and connected continuously therewith, said intermediate zone having a focal power which varies progressively from the first focal power at its upper limit to the second focal power at its lower limit in accordance with said predetermined law along said part of the main meridian curve, which extends substantially vertically through the three zones in their middle and is an umbilic curve at least in the intermediate zone, the difference between said second power and said first power being called the power addition, the whole of the intermediate and lower zones being divided into three horizontally spaced parts, i.e. a median part and two outer lateral parts separated from the median part by two curves which are symmetrical with respect to the main meridian curve, wherein the two curves are lines of discontinuity of the surface of refraction which is formed from two different geometric surfaces, said upper zone and said median part of the whole of the intermediate and lower zones being formed by corresponding parts of a first geometric surface selected from a first family of surfaces in which the astigmatism aberrations are concentrated outside said curves, said outer lateral parts being formed by corresponding parts of a second geometric surface selected from a second family of surfaces having, in their lateral parts, horizontal lines along which the vertical component of the prismatic effect is substantially constant, and a vertical line along which the horizontal component of the prismatic effect has a constant value and at each point of which the value of the vertical component of the prismatic effect differs at most by 0.7a with respect to the value of the vertical component of the prismatic effect at the point of said main meridian curve having the same vertical coordinate as the point considered of said vertical line, a representing said power addition, the two curves being curves of intersection of the first selected surface and of the second selected surface and being spaced at least 15 mm from each other in said intermediate zone and at least 18mm in said lower zone.

2. A method of preparing a surface of refraction of a progressively variable focal power ophthalmic lens, comprising the steps of defining a curve having a curvature which varies progressively in accordance with a predetermined law along at least one part of said curve, defining a first family of surfaces admitting said curve as main meridian curve, so that each surface of the first family comprises an upper zone having a first substantially constant focal power for distant vision, a lower zone having a second substantially constant focal power for near vision and an intermediate zone situated between the upper and lower zones and connected continuously therewith, said intermediate zone having a focal power which varies progressively from the first focal power at its upper limit to the second focal power at its lower limit in accordance with said predetermined law along said part of the main meridian curve, which extends substantially vertically through the three zones in their middle and is an umbilic curve at least in the intermediate zone, the difference between said second power and said first power being called the power addition, drawing up for each surface of the first family a table of deviations with respect to a reference sphere and a chart of astigmatism aberrations, selecting from the surfaces of the first family those whose astigmatism aberrations are concentrated in the outer lateral parts of the intermediate zone, wherein it further comprises the steps of defining a second family of surfaces having a progressively variable curvature, so that each surface of the second family comprises a lower zone having a surface area at least equal to that of the whole of the intermediate zone and of the lower zone of the surfaces of the first family and, that in its lateral parts, said lower zone of said surface of the second family comprises horizontal lines along which, the vertical component of the prismatic effect is substantially constant, and a vertical line along which the horizontal component of the prismatic effect has a constant value and at each point of which the value of the vertical component of the prismatic effect differs at most by 0.7a with respect to the value of the vertical component of the prismatic effect at the point of said main meridian curve having the same vertical coordinate as the point considered of said vertical line, a representing said power addition, drawing up for each surface of the second family a table of deviations with respect to said reference sphere, associating each selected surface of the first family with each surface of the second family, determining for each pair of associated surfaces the points of intersection of the surfaces of the pair considered from their respective deviation tables, plotting the curves of intersection for each pair of associated surfaces, selecting from the pairs of associated surfaces the pair of surfaces having two curves of intersection which are each situated on a respective side of the main meridian curve and which are spaced at least 15 mm from each other in said intermediate zone and at least 18 mm in said lower zone, and selecting as surface of refraction for the ophthalmic lens a surface having an upper zone identical to that of the surface of the first family of the selected pair, and a lower zone comprising a median part and two lateral parts separated from the median part by said curves of intersection, the median part being identical to the part, situated between the two curves of intersection, ot the surface of the first family which constitutes one of the two surfaces of the selected pair of associated surfaces, and the two lateral parts being identical to the parts, situated outside the two curves of intersection, of the surface of the second family which constitutes the other one of the two surfaces of said selected pair.

3. The method as claimed in claim 2, wherein the surfaces of the first family are defined so as to have upper aspherical zones whose focal power does not deviate from the first focal power by more than 0.12 D.

4. The method as claimed in claim 2, wherein the surfaces of the first family are defined so as to have identical and spherical upper zones.

5. The method as claimed in 2, wherein the surfaces of the second family are defined so as to have an upper zone identical to those of the surfaces of the first family.

* * * * *